United States Patent [19]

Held

[11] Patent Number: 4,830,037
[45] Date of Patent: May 16, 1989

[54] CANOPY ATTACHMENT FOR A GOLF CART

[76] Inventor: William T. Held, 105 Molnar Dr., West Seneca, N.Y. 14224

[21] Appl. No.: 115,975

[22] Filed: Nov. 2, 1987

[51] Int. Cl.⁴ ............................................. E04H 15/06
[52] U.S. Cl. ................................. 135/88; 280/DIG. 5
[58] Field of Search .................. 135/88; 280/DIG. 5, 280/DIG. 6; 297/184

[56] References Cited

U.S. PATENT DOCUMENTS

| | | | |
|---|---|---|---|
| 3,671,071 | 6/1972 | Evinrude | 280/DIG. 5 |
| 4,008,874 | 2/1977 | Conway | 280/DIG. 6 |
| 4,013,315 | 3/1977 | West | 280/DIG. 5 |
| 4,037,614 | 7/1977 | Hines et al. | 135/88 X |
| 4,098,536 | 7/1978 | Mills | 135/88 |

FOREIGN PATENT DOCUMENTS 3517967 11/1985 Fed. Rep. of Germany ........ 135/88

*Primary Examiner*—J. Karl Bell
*Attorney, Agent, or Firm*—Christel, Bean & Liniham

[57] ABSTRACT

A protective canopy attachment for a motorized golf cart of the type having an uncovered rear compartment within which golf bags and clubs are positioned during use of the cart utilizes frame members attachable to the cart and a canopy assembly movably secured to the frame members. The canopy assembly includes a pair of brackets pivotally connected to the frame members and a flexible cover section which is draped across portions of the brackets. The brackets are movable relative to the frame members between an operative condition at which the cover section is arranged in a taut condition across the rear compartment for protecting bags and clubs positioned therein and a non-operative condition at which the cover section is arranged in a limp, out-of-the-way condition so as not to obstruct the withdrawal of clubs from the bags.

12 Claims, 2 Drawing Sheets

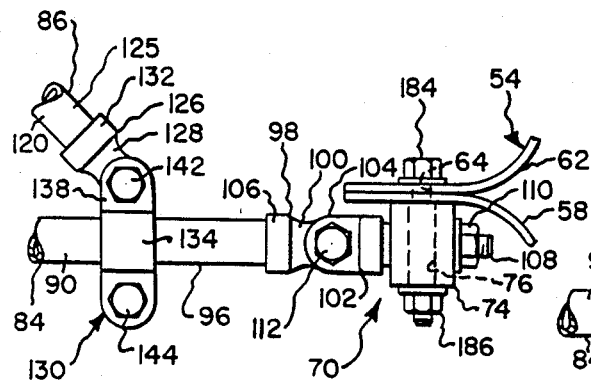
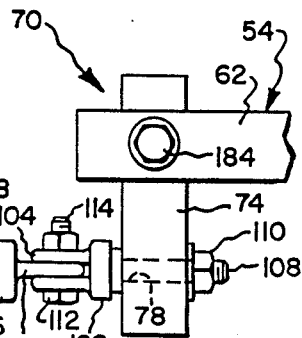
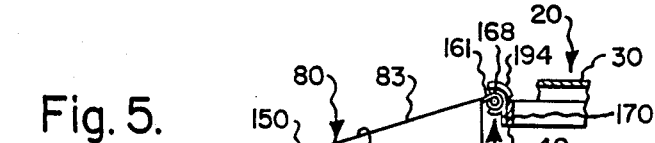
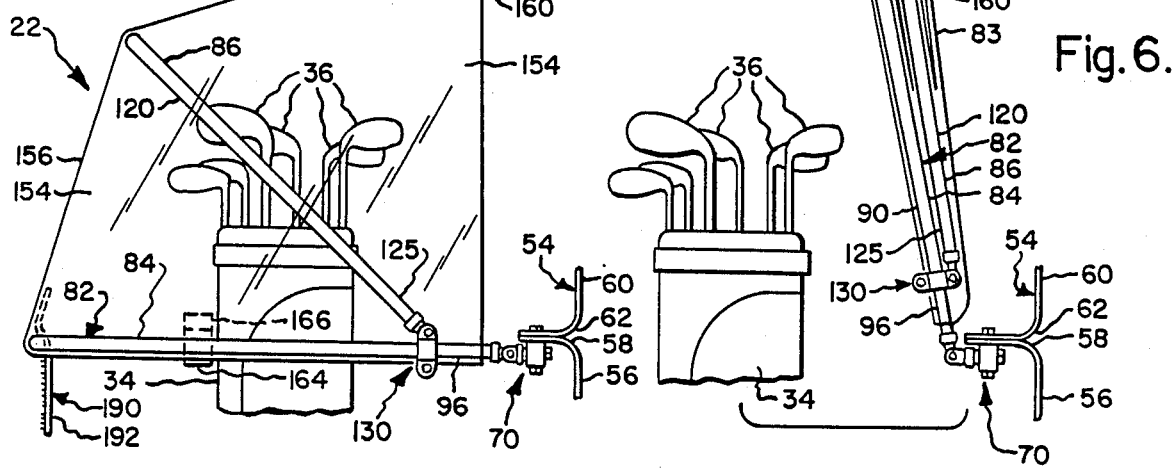
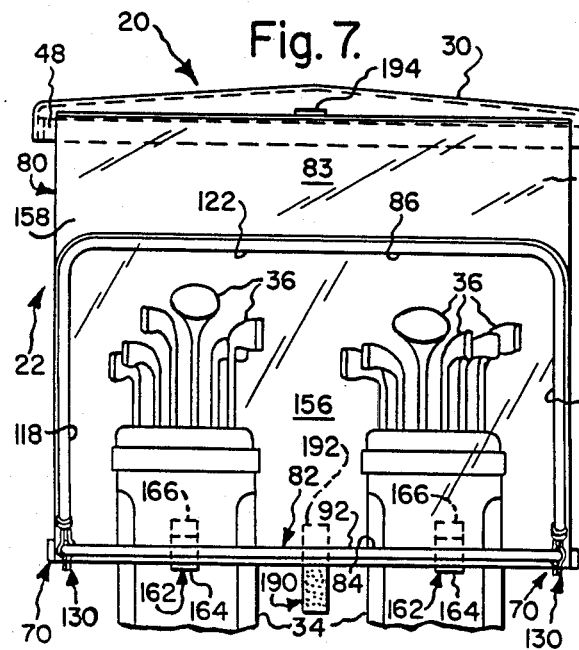
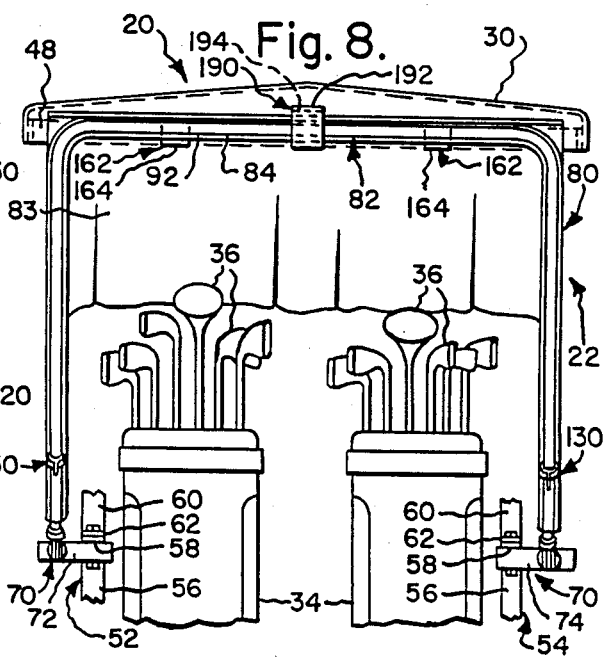

CANOPY ATTACHMENT FOR A GOLF CART

BACKGROUND OF THE INVENTION

This invention relates generally to golfing accessories and relates more particularly to a protective attachment for a golf cart.

The type of golf cart with which this invention is concerned includes a rear compartment into which a golf bag and clubs are positioned during use of the cart. Commonly, the rear compartment of the cart is uncovered, even if the cart includes a top section for covering the seating compartment of the cart. Hence, the golf bag and clubs positioned in the rear compartment of the cart are unprotected from weather precipitation, such as rainfall. Inasmuch as the golfer's grip on his clubs, and hence his game, can be adversely effected if the grips of his clubs become wet, it would be desirable to provide means for protecting his bag and clubs from weather precipitation while the bag and clubs are positioned in the rear compartment of a golf cart.

It is an object of the present invention to provide a new and improved attachment for the rear compartment of a golf cart for protecting a golf bag and clubs positioned therein from weather precipitation, such as rainfall.

Another object of the present invention is to provide such an attachment having a covering section which can be selectively moved into and out of an operative condition at which the rear compartment of the cart is covered by the covering section.

Yet still another object of the present invention is to provide such an attachment which is easily attached to and detached from a golf cart.

A further object of the present invention is to provide such an attachment which is durable and uncomplicated in structure and effective in operation.

SUMMARY OF THE INVENTION

This invention resides in a canopy attachment for the rear of a golf cart having an uncovered rear compartment into which a golf bag and clubs are positioned during use of the cart.

The canopy attachment includes frame means adapted to be attached to the golf cart and canopy means movably secured to the frame means. The canopy means is movable relative to the frame means between an operative condition at which the canopy means covers the rear compartment of the cart and an inoperative condition at which the rear compartment is uncovered.

BRIEF DESCRIPTION OF THE DRAWING FIGURES

FIG. 3 is a fragmentary side elevation view of a portion of the FIG. 2 embodiment as seen generally from the right in FIG. 2.

FIG. 4 is a fragmentary plan view of the FIG. 3 portion as seen from above in FIG. 3.

FIG. 5 is a side elevation view of the FIG. 2 embodiment as seen from the right in FIG. 2 illustrating the embodiment when placed in its operative, bag-covering condition.

FIG. 6 is a side elevation view similar to that of FIG. 5 illustrating the embodiment when placed in its non-operative, out-of-the-way condition.

FIG. 7 is a rear elevation view of the FIG. 2 embodiment as seen from the left in FIG. 5.

FIG. 8 is a rear elevation view of the FIG. 2 embodiment as seen from the left in FIG. 7.

DETAILED DESCRIPTION OF THE ILLUSTRATED EMBODIMENTS

Figures 1, 2:
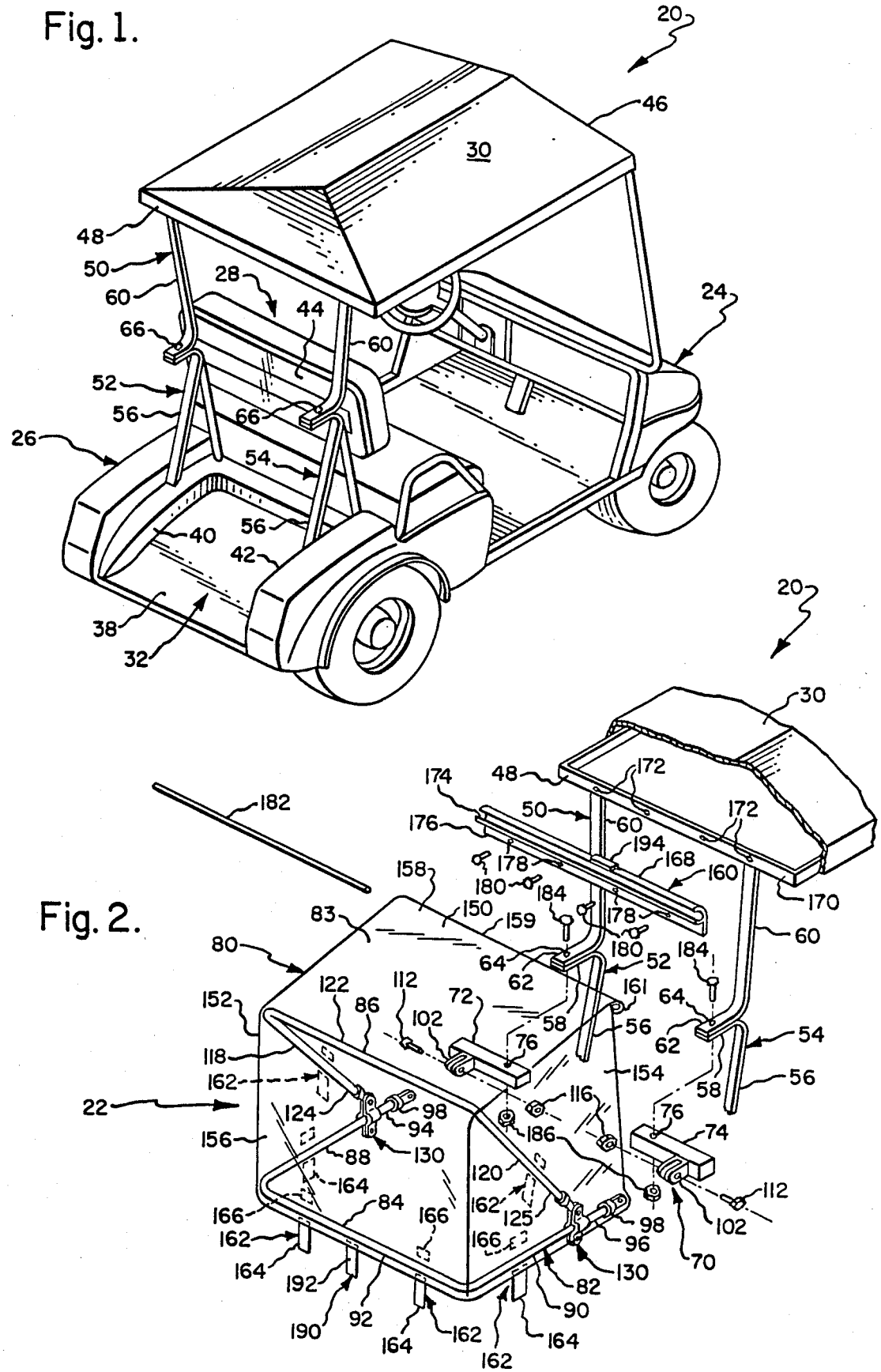
FIG. 1 is a perspective view of a golf cart with which an embodiment of the present invention can be operatively utilized.
FIG. 2 is a fragmentary perspective view of the FIG. 1 cart and an embodiment of the present invention, shown exploded.

Turning now to the drawings in greater detail, there is shown in FIG. 1 a motorized golf cart 20 to which an embodiment of a canopy attachment in accordance with the present invention, generally indicated 22 in FIG. 2, can be attached. The golf cart 20 has a front 24, a rear 26, and a seating compartment 28 intermediate of the front 24 and rear 26. The cart 20 includes a top 30 for purposes of protecting occupants seated in the seating compartment from adverse weather conditions and includes a rear compartment, indicated 32, into which golf bags 34 (FIGS. 5-8) and clubs 36 are secured during use of the cart 20.

With reference again to FIG. 1, the rear compartment 32 of the golf cart opens generally rearwardly of the cart 20 and is defined by a bottom 38 upon which the bags 36 are adapted to rest, two opposite sides 40,42 and the back 44 of the cart seat. The top 30 of the cart 20 defines a front edge 46 and a rear edge 48 and is substantially centered over the seating compartment 28. No part of the top 30 is disposed directly over the rear compartment 32 leaving the rear compartment 32 uncovered and, hence, exposed to weather precipitation such as rainfall. As will be explained hereinafter, the canopy attachment 22 (FIG. 2) of the present invention is attachable to the golf cart 20 for purposes of covering bags 34 (FIGS. 5-8) positioned within the rear compartment 32 and thereby protecting the bags 34 from rainfall and other weather-related precipitation.

With reference to FIGS. 1 and 2, the top 30 is supported above the remainder of the golf cart 20 by means of a support post arrangement 50 including two post assemblies 52,54 extending generally upwardly from the rear compartment 32. Each post assembly 52 or 54 includes a first rigid post 56 having an arcuate upper end 58 and a second rigid post 60 having a lower arcuate end 62. The second post 60 in each assembly 52 or 54 is disposed above the first post 56 so that its lower arcuate end 62 engagably overlies the upper arcuate end 58 of the first post 56. Each of the engaging arcuate ends 58 and 62 define aligned opening 64, and the first and second posts 56 and 60 of each assembly 52 or 54 are operatively secured to one another by means of a bolt 66 having a shank which extends through the aligned openings 64 and an associated nut which is threadably accepted about the end of the bolt 66.

In accordance with the present invention and with reference to FIGS. 2-4, the canopy attachment 22 includes frame means 70 adapted to be attached to the golf cart 20. In the canopy attachment 22, the frame means 70 includes two bar sections 72 and 74 each having a first through-opening 76 and a second through-opening 78 defined therein. Each bar section 72 or 74 is elongated in shape with two opposite ends and is relatively short in length as measured between its ends. The first through-opening 76 is defined in each bar section 72 or 74 is located adjacent one end thereof, and the second through-opening 78 defined in each bar section 72 or 75 is located adjacent the other end thereof.

With reference still to FIG. 2, the canopy attachment 22 further includes canopy means, generally indicated 80, secured to the frame means 70 and movable relative thereto between operative and inoperative conditions, described hereinafter. The canopy means 80 includes a frame structure 82 and a cover section 83 supportedly attached to the frame structure 82 for movement therewith. The frame structure 82 includes a pair of generally U-shaped metal brackets 84 and 86 which are pivotally attached to one another and to the frame means 70. The bracket 84 includes two parallel cylindrically-shaped legs 88,90 and an elongated cylindrically-shaped connecting portion 92 extending between the legs 88,90. The length of each connecting portion 92 corresponds generally to the width of the rear compartment 32 of the cart 20, and the length of each bracket leg 88 or 90 corresponds generally to the width of the rear compartment 32 of the cart 20, and the length of each bracket leg 88 or 90 corresponds generally to the depth of the rear compartment 32.

Each leg 88 or 90 of the bracket 84 defines an end portion 94 or 96 which is pivotally connected to a corresponding one of the bar sections 72 and 74 of the frame means 70. To this end, and as exemplified by the end portion 96 and bar section 74 of FIGS. 3 and 5, a member 98 having a ring portion 100 is fixedly secured to each leg end portion 94 or 96 and a member 102 having a clevis portion 104 is fixedly secured to each bar section 72 or 74. The member 98 includes a sleeve portion 106 attached to so as to extend from the ring portion 100, and the sleeve portion 106 is positioned about and fixedly secured, as by welding, to the corresponding leg end portion 94 or 96.

Each member 102 includes a threaded shank 108 attached to so as to extend from the clevis portion 104. The threaded shank 108 of each member 102 extends through a corresponding bar section aperture 78, and a nut 110 is tightened upon the shank 108 so that each member 102 is maintained in a stationary relationship with the corresponding bar section 72 or 74 as the bar section 72 or 74 is tightly held between the clamping portion 104 and the nut 110.

For pivotally joining the members 98 and 102 at each end portion 94 or 96 the ring portion 100 is positioned between the forks of the clevis portion 104 so that the openings therein are aligned, and a bolt 112 having a shank 114 is operatively secured to each member 98 and 102. More specifically, the bolt shank 114 is positioned through the aligned openings in the ring and clevis portions 100 and 104, respectively, and a nut 116 is threaded upon the shank 114 to prevent the bolt 112 from coming out of the aligned openings. Hence, the bolt 112 associated with each leg portion 94 or 96 acts as a pivot pin permitting the members 98 and 102, and hence the leg portions 94 and 96, to pivot relative to the members 102. It follows that the bracket 84 is thereby permitted to pivot about the bolts 112 and relative to the bar sections 74 and 76.

With reference again to FIGS. 2–4, the bracket 86 includes two parallel cylindrically-shaped legs 118,120 and an elongated, cylindrically-shaped connecting portion 122 extending between the legs 118 and 120. The length of each connecting portion 122 is about equal to the width of the rear compartment 32 of the cart 20, and the length of each bracket leg 118 or 120 is slightly shorter than the length of each bracket leg 88 or 90 of bracket 84. Each leg 118 or 120 of the bracket 86 defines an end portion 124 or 125 which is pivotally connected to a corresponding one of the legs 88 and 90 of the bracket 84. To this end and as exemplifed by the end portion 125 and bracket leg 102 of FIGS. 3 and 4, a member 126 having a ring portion 128 attached thereto is fixedly secured to each leg end portion 124 or 126 and a saddle clamp 130 is fixedly secured to each leg 88 or 90 and adjacent the end portion 94 or 96 thereof.

Each member 126 includes a sleeve portion 132 attached so as to extend from the ring portion 128, and the sleeve portion 132 is positioned about and fixedly secured, as by welding, to the corresponding leg 88 or 90. The clamp 130 includes two clamp members 134 and 136 positioned about the corresponding leg 88 or 90, and each clamp member 134 or 136 includes two opposite flanges 138,140 through which apertures are defined. The clamping members 134 and 136 are positioned on opposite sides of the corresponding leg 88 or 90 so that the leg 88 or 90 is sandwiched therebetween and the apertures defined in opposing flanges of the clamping members 134 and 136 are aligned.

The ring portion 128 of member 126 is positioned between the flanges 138,140 (FIG. 4) of a corresponding clamping member 134 or 136 so that its opening is aligned with the flange apertures. Bolts 142,144 having shanks 146 and nuts 148 (only one shown in FIG. 4) are utilized to secure the clamp 130 to the corresponding bracket leg 88 or 90. More specifically, the shank 146 of each bolt 142 or 144 extends through the aligned flange apertures and the nuts 148 are threaded upon the end of the shanks 146 so that the clamp members 134 and 136 are secured between the nuts 138 and the heads of the bolts 142 and 144. Preferably, the clamp member flanges 138,140 are not tightly secured by the bolt 142 and nut 148 so that the member 126 is free to pivot relative to the clamp 130 with relative ease. It follows from the foregoing that the bracket 86 is permitted to pivot about the bolts 142 and relative to the bracket leg 88 and 90.

With reference again to FIG. 2, the cover section 83 of the canopy means 80 includes a sheet 150 of waterproof, flexible material folded and joined along appropriate edges 50 as to provide a covering draped across the brackets 84 and 86. The cover section 83 is constructed of a transparent plastic and defines two opposite side sections 152 and 154, a back section 156 and a top section 158. As shown in FIG. 2, the side sections 152 and 154 are operatively arranged against a corresponding pair of bracket legs 88,118 or 90, 120, the back section 156 is arranged so as to span the space defined between the connecting section 92 and 122 of the brackets 84 and 86, and the top section 158 is arranged adjacent the connecting section 122 so as to extend forwardly thereof. The top section 158 defines a forwardmost edge portion 159 which is folded back and stitched upon itself so as to form a sleeve 161 having an opening extending from one side of the cover section 83 to the other.

The canopy means 80 further includes attachment means, generally indicated 160, for securing the cover section 83 to the brackets 84,86. In the canopy attachment 22, the attachment means 160 includes hook and loop type fasteners 162, such as are sold under the trade designation Velcro, for releasably attaching the cover section 83 to the brackets 84,86. Each hook and loop type fastener 162 includes a hook bundle strip 164 stitched to the cover sheet 150 at appropriate locations thereon adjacent a corresponding bracket 84 or 86 and a loop bundle strip 166 stitched to the cover sheet 150 adjacent the hook bundle strip 164. By wrapping each hook bundle strip 164 about the adjacent bracket 84 or 86 and pressing the strip 164 against its corresponding loop bundle strip 166, the cover section is releasably secured to the brackets 84 and 86.

With reference still to FIG. 2, the canopy attachment 22 further includes an attachment member 168 adapted to be secured to the back edge 48 of the top 30 of the cart 20. The back edge 48 defines a planar and rearwardly-facing surface 170 and for purposes of accommodating the attachment member 168 thereto includes a series of preformed threaded openings 172 extending along the edge 48. The attachment member 22 is elongated in shape and includes an upper section 174 and a lower section 176. The upper section 174, as viewed in cross section, is somewhat C-shaped and the lower section is platen-like and joined to the upper section so as to depend downwardly therefrom. Defined along the length of the lower section 176 is a series of openings 178 which, when operatively positioned against the back edge 48 of the cart top 30, are aligned with the threaded openings 172 defined therealong. To secure the attachment 168 to the back edge 48, shanks of screws 180 are inserted into the aligned openings 178 and 172 and tightened within the threads of the openings 172. The attachment member 168 can be constructed of any of a number of suitable materials, such as plastic.

With the attachment member 168 operatively secured to the back edge 4B of the cart top 30, and as best shown in FIGS. 5 and 6, the C of the upper section 174 opens rearwardly of the cart 20. As will be explained hereinafter, the attachment member 168 cooperates with an elongated dowel element 182 for securing the forwardmost edge 159 to the cart top 30.

In order to attach the canopy attachment 22 to the golf cart 20 and with reference again to FIGS. 1 and 2, each bolt 66 (FIG. 1) is removed from its secured relationship with the post assembly 52 or 56 to expose the aligned openings 64. Each bar section 72 or 74 is then operatively positioned in engagement with the arcuate upper end 58 of the corresponding post 56 so that its through-opening 76 is aligned with a corresponding one of the aligned openings 64, and a bolt 184 is inserted through each alignment of openings 64 and 76. Nuts 186 are then threaded upon the shank of the bolts 184 to tightly secure the bar sections 72 and 74 to the post assemblies 52 and 54. The shank of each bolt 184 is of sufficient length to extend through the aligned openings 64 and 76 and threadably accept the nut 186. It follows that by securing the bar sections 72 and 74 to the post assemblies 52 or 54, the brackets 84 and 86 are operatively secured to the golf cart 20.

With reference still to FIG. 2, the forwardmost edge 159 of the cover section 158 is securable to the attachment member 168 by means of the dowel element 182, mentioned earlier. The dowel element 182 is elongated in shape and is about the same length as the attachment bracket 168. Furthermore, the outer diameter of the dowel element 182 is small enough to be slidably received endwise by the C of the upper portion 174 of the attachment member 168 when inserted endwise therein yet large enough to prevent the dowel element 182 from passing through the rearwardly-facing opening in the C. In the illustrated embodiment 22, the dowel element 182 is in the form of tubing constructed of flexible plastic, but it will be understood that the dowel element 182 can be constructed of any of a number of suitable materials.

To secure the forwardmost edge 159 of the top section 158 of the cover to the attachment member 168, the sleeve 161 formed in the forwardmost edge 159 is directed through the opening of the C of the upper portion 174 so as to be positioned therein. One end of the dowel element 182 is then directed into one end of the opening defined in the sleeve 161 and forced therethrough until each end of the dowel element 182 corresponds with an end of the sleeve 161 and an end of the attachment member 168. The sleeve 161, and hence the forwardmost edge 159, is thereby secured to the attachment member 168 as the sleeve 161 is captured between the outer surface of the dowel element 182 and the inner walls of the C of the upper section 174. The dowel element 182 is prevented from migrating out of the sleeve 161 by the frictional engagement therewith.

With the bar sections 72 and 74 operatively secured to the post assemblies 52,54 and the forwardmost edge 159 of the cover section 158 secured to the attachment member 168 as aforesaid, the canopy means 80 is in condition for movement between operative and inoperative positions as illustrated in FIGS. 5–8. More specifically, the canopy means 80 is in condition for movement between an operative condition, as illustrated in FIGS. 5 and 7, at which golf bags 34 and clubs 36 are covered and thereby protected from rainfall and other weather-related precipitation and an inoperative, out-of-the way-condition, as illustrated in FIGS. 6 and 8, at which the clubs 36 can be withdrawn from the bags 34.

In the aforedescribed operative condition, of the canopy means 80, brackets 84 and 86 are supported by the cover section 83 and from the attachment member 168 so that the bracket 84 is arranged in plane oriented substantially horizontally and the bracket 86 is arranged in a plane oriented at an acute angle in relation to the horizontal. In such a condition, the back and top sections 156 and 158, respectively, of the cover section 83 are held in a taut condition between the connecting section 92 of bracket 84 and the attachment member 168 as the bracket 84 is held in the illustrated cantilevered condition of FIG. 5 by the cover section 83. Furthermore, the side sections 152 and 154 of the cover section 83 are each held taut in a planar condition against a corresponding set of bracket legs 88, 118 and 90,120. The weight of the bracket 84 has been found to be effective in maintaining the canopy means 80 in the operative condition.

In the aforedescribed inoperative condition, the brackets 84 and 86 are each oriented in planes which are slightly inclined to the vertical as viewed in FIG. 6. Furthermore, the back and top sections 156 and 158, respectively, drape between a corresponding pair of the bracket connecting sections 92 and 122 and between the bracket connection section 122 and the attachment member 168 while each of the side sections 152 and 154 of the cover section 83 is limp and folded upon itself. The canopy means 80 can be releasably secured in the non-operative condition by means of a hook and loop-type fastener 190 (FIGS. 5 and 6) including a loop bundle strip 192 attached at one end to the back section 156 of the cover section 83 and a hook bundle strip 194 fixedly secured atop the attachment member 168. By wrapping the free end of the strip 192 about the bracket connecting sections 92 and 122 as illustrated in FIG. 6 and pressing the strip 192 against the hook bundle strip 194, the canopy means 80 are releasably secured in the non-operative condition.

As the canopy means 80 are moved between the operative condition of FIGS. 5 and 7 and the non-operative condition of FIGS. 6 and 8 and with reference to FIGS. 2-4, the bracket 84 pivots relative to the bar sections 72 and 74 about the bolts 112 and the bracket 86 pivots relative to the bracket 84 about the bolts 142. Consequently, the brackets 84 and 86 are moved from an angularly related relationship as illustrated in FIG. 5 to a condition at which the connecting sections 92 and 122 of the brackets 84 and 86 are positioned adjacent one another. Furthermore, the back 156 of the cover section 83 is permitted to drape and become limp as a natural result of the bringing together of the bracket connecting sections 92 and 122, and the top 158 of the cover section 83 is permitted to drape and become limp as a natural result of the bringing together of the bracket section 122 and the attachment member 168. Hence, the cover section 83 moves between taut and limp conditions in an accordian-style fashion as the canopy means 80 are moved between operative and non-operative conditions.

It follows that the canopy attachment 22 accomplishes its intended objects and objective in that it provides means by which golf bags and clubs positioned in the rear compartment of a golf cart can be selectively covered fro the purpose of protecting the bags and clubs from weather-related precipitation or uncovered for the purpose of rendering the clubs accessible.

It will be understood that numerous modifications and substitutions can be had to the aforedescribed embodiment without departing from the spirit of the invention. For example, although the frame means 70 has been shown and described above as including two bar sections 72 and 74, the frame means in accordance with the canopy attachment of the present invention can include a single bar for spanning and attachment to both post assemblies 52 and 54 and thereby providing means to which both legs 88 and 90 of the bracket 84 can be pivotally attached. Accordingly, the aforedescribed embodiment is intended for the purpose of illustration and not as limitation.

I claim:

1. In combination with a golf cart of the type having a forward seating compartment, a rear golf bag compartment, and a top assembly including a top disposed over the seating compartment, the top assembly additionally including front and rear laterally spaced apart frame members which support the top, the rear frame members being disposed between the forward seating compartment and rear golf bag compartment, the improvement which comprises a protective canopy assembly which includes a protective canopy attachment and mounting means secured to an intermediate portion of the rear laterally spaced apart frame members, the canopy attachment being at least partially supported by the mounting means and being moveable between a lowered first position where it may protectively cover golf bags and clubs positioned within the rear golf bag compartment and a raised second position wherein the golf bags may be unloaded from the rear golf bag compartment, the canopy attachment including a frame structure attached to the mounting means for movement relative thereto, and a cover assembly supported by the frame structure and secured to an upper rear portion of the top assembly.

2. The combination as set forth in claim 1 wherein said frame structure includes two brackets having portions which are movable toward and away from one another as said canopy attachment is moved between the first and second positions, and said cover assembly includes a cover section constructed of a flexible material and having portions which are secured to said portions of both brackets so that movement of said bracket portions toward and away from one another moves the cover section portions between taut and limp conditions.

3. The combination as set forth in claim 2 further comprising means for releasably securing said cover section to said frame structure permitting said cover section to be selectively attached and detached from said frame structure.

4. The combination as set forth in claim 3 wherein said means for releasably securing said cover section to said frame structure includes press type fasteners attached to preselected locations of the cover section.

5. The combination as set forth in claim 1 wherein said cover assembly includes attachment means secured at an upper rear portion of the top assembly and a cover section secured to an upper forward edge to the attachment means so that at least a portion of the weight of said frame structure and cover section is supported from the top assembly by means of said cover section.

6. The combination as set forth in claim 1 wherein said frame structure includes two U-shaped brackets, at least one of which is pivotally attached to said mounting means for pivotal movement of said canopy attachment relative thereto.

7. The combination as set forth in claim 6 wherein each U-shaped bracket has two parallel legs and a connecting section extending between the two legs, each leg of said two U-shaped brackets being pivotally interconnected to said mounting means so that pivotal movement of said brackets relative to said mounting means moves said connecting sections of said brackets between a spaced-apart condition arranged directly above the rear compartment and a condition at which the connecting sections are positioned adjacent one another and generally above and forwardly of the rear compartment.

8. The combination as set forth in claim 7 wherein the cover assembly includes a cover section attached to said connecting portions of said two U-shaped brackets so as to span the space therebetween, the cover section including a forward edge which is secured to the back edge of the golf cart top assembly so that at least a portion of the weight of said brackets is supported from the top assembly by means of said cover section.

9. The combination as set forth in claim 7 wherein the legs of one of said brackets are pivotally attached to said mounting means and the legs of the other bracket are pivotally attached to said one bracket so that movement of said canopy attachment between said operative and non-operative conditions pivots said one bracket relative to said mounting means and pivots said other bracket relative to said one bracket.

10. The combination as set forth in claim 1 further comprising means for releasably securing said canopy attachment in said second position.

11. A protective canopy attachment for attachment to a golf cart having a front, a rear, a seating compartment intermediate of the front and rear of the cart and a top assembly including a top supported generally above the seating compartment and front and rear laterally spaced apart frame members which support the top, said cart further including a rear compartment into which golf clubs and bags are positioned during use of the cart, and mounting means adapted to be attached to the rear frame members adjacent the rear compartment thereof and in a stationary relationship therewith said canopy assembly comprising:
- a pair of U-shaped brackets pivotally interconnected to the mounting means for pivotal movement between an operative condition at which said brackets are positioned generally above the rear compartment of the cart and a non-operative, out-of-the-way condition, attachment means secured to an upper rear portion of the top assembly, and
- a cover section secured to said brackets and said attachment means for movement therewith as the brackets are moved between said operative and non-operative conditions so that said cover section can be selectively moved between one condition at which said cover section protectably covers the golf bags and clubs positioned within the rear compartment and another condition at which said cover section does not inhibit the removal of clubs from the golf bags.

12. The assembly of claim 11 wherein one of the brackets is pivotally connected to the other for pivotal movement of one of the brackets relative to the other of the brackets, said one and the other bracket having portions which are movable toward and away from one another as said brackets are pivotally moved relative to one another, and said cover section is constructed of a flexible material and has portions which are secured to the movable portions of both brackets so that movement of said movable bracket portions toward and away from one another moves said cover section between taut and limp conditions.

* * * * *